W. G. WINANS.
LEAF SPRING SPREADER.
APPLICATION FILED DEC. 2, 1915.
1,199,327.
Patented Sept. 26, 1916.
2 SHEETS—SHEET 1.
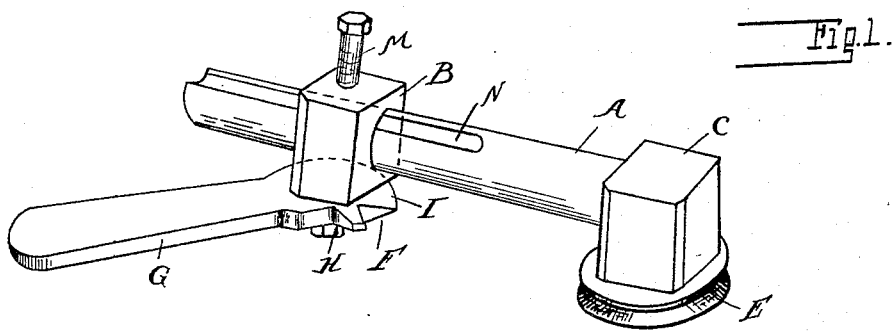
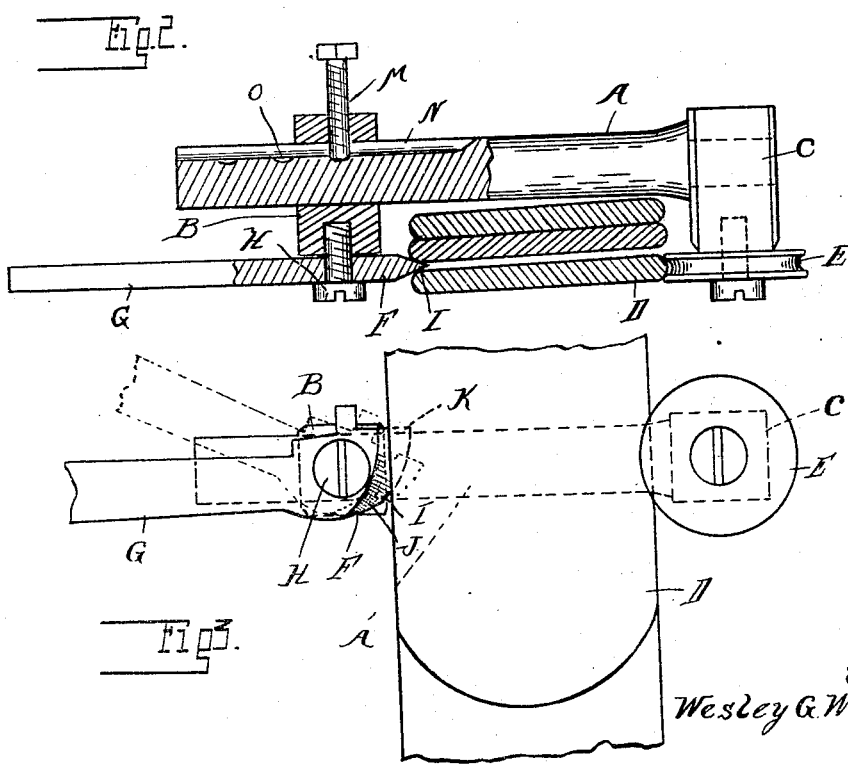
Inventor
Wesley G. Winans
By Whittemore Hulbert & Whittemore
Attorneys

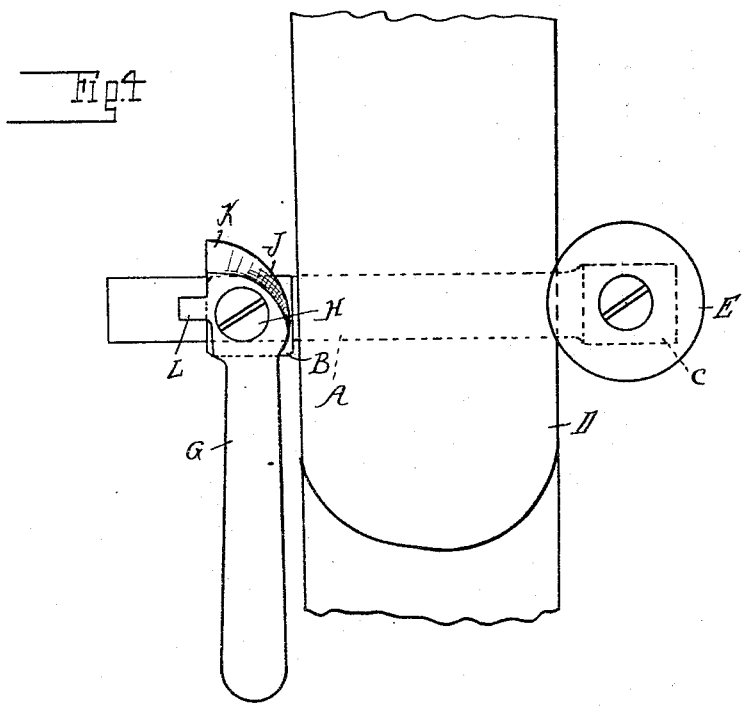

UNITED STATES PATENT OFFICE.

WESLEY G. WINANS, OF DETROIT, MICHIGAN, ASSIGNOR TO WINANS MANUFACTURING CO., OF DETROIT, MICHIGAN, A CORPORATION OF MICHIGAN.

LEAF-SPRING SPREADER.

1,199,327. Specification of Letters Patent. Patented Sept. 26, 1916.

Application filed December 2, 1915. Serial No. 64,643.

*To all whom it may concern:*

Be it known that I, WESLEY G. WINANS, a citizen of the United States of America, residing at Detroit, in the county of Wayne and State of Michigan, have invented certain new and useful Improvements in Leaf-Spring Spreaders, of which the following is a specification, reference being had therein to the accompanying drawings.

The invention relates to leaf spring spreaders and resides in the provision of a simple and efficient device by which the leaves of the spring may be readily spread to permit of oiling or the like; in the provision of a bearing for engaging the leaves of the spring, which coöperates with a wedge entering between the leaves of the spring and which does not interfere with the separation of the leaves, in the provision of a leaf spring spreader in which the parts will not work loose and get out of order.

The invention further resides in certain combinations and arrangements of parts as will more fully hereinafter appear.

In the drawings, Figure 1 is a perspective view of the spreader; Fig. 2 is a side elevation with certain parts in section; Fig. 3 is a plan view illustrating the method of separating the springs; and Fig. 4 is a view similar to Fig. 3, showing the parts in a different adjustment.

In leaf springs, particularly leaf springs employed upon vehicles, it is customary to lubricate the springs from time to time so as to lessen the friction and wear between the contacting faces of the springs and also prevent squeaking of the springs due to the rubbing of one leaf upon the other when the springs vibrate. Lubrication of the contacting faces of the leaves is accomplished by spreading the springs and injecting or otherwise placing lubricant between adjacent spring members.

By my invention I provide a novel and very efficient tool for spreading the leaves. Referring more particularly to the one embodiment of the invention shown in the drawings, A designates the body of the tool, having arms B and C spaced a sufficient distance apart to receive a spring D therebetween and forming in effect a yoke. Arranged upon the arm C is a bearing E for engaging one side of the spring, and mounted upon the arm B is a wedge-shaped bearing F, herein shown eccentric in shape, adapted to enter between the leaves of the spring.

G is a handle herein shown as formed integral with the bearing F and adapted to actuate the latter. As shown, the bearing F is pivotally secured to the outer end of the arm B as by means of a bolt H.

To separate the leaves the tool is applied with the bearing E in contact with one leaf on one side of the spring and the bearing F in the position shown in Fig. 4. The operator then moves the eccentric to the position shown in full lines in Fig. 4, which will force the wedge-shaped edge I of the bearing F between the leaves and separate the same, as will be readily understood.

In forcing the wedge-shaped edge I between the leaves the bearing E will be drawn against one side of the spring. I find that if a bearing is employed in which the point of contact with the side edge of the spring is upon opposite sides of the leaves to be separated, the pressure of the bearing will tend to prevent the spreading of the leaves. To overcome this objection leaf spring spreaders have been employed in which two opposed wedges were used, but a wedge or a pointed member for a stationary bearing I find to be objectionable, since it tends to break off. I have therefore, devised a bearing which is in the form of a grooved member, preferably in the form of a grooved roller pivotally mounted upon the upper end of the arm C. The grooved face of the roller is such as to engage the side edge of a leaf of the spring, but does not enter between the leaves of the springs, as shown in Fig. 1, and as it engages with but one spring it does not interfere with the separation of the leaves. The groove in the periphery of the roller is comparatively shallow and of such a curvature as to readily engage with the side edges of leaves of various thickness. This roller acts to hold one side of the tool against vertical movement when the tool is engaged with the springs.

There is another advantage in employing a roller with the type of bearing F shown herein, in that there is a tendency for the body portion A to move longitudinally of the spring when the handle G is turned to force the wedge-shaped edge I between the leaves, and the roller will allow the arm C to readily move longitudinally of the spring so as to remain in alinement crosswise of the spring when the tool is in position to hold the leaves in their separated relation.

As shown the cam or bearing F has the portion J that initially engages the spring, at a shorter distance from the pivot H than the portion K near the rear edge of the cam. This permits the lever to remain in its adjusted position. However, in order to prevent the pressure of the leaves upon the cam from accidentally returning the cam to the position shown in Fig. 4, preferably the lever and cam are moved to the position shown in dotted lines in Fig. 3. The parts are so proportioned that in the latter position there is a tendency for the pressure of the leaves to move the cam and lever in the same direction these parts are moved during the engaging operation. This movement, however, is limited by a stop L on the cam.

Preferably the member B is made adjustable longitudinally of the body portion A. Thus, as shown, the portion B is sleeved upon the body portion A and carries a set-screw M which engages a grooved portion N in the body A. Preferably the grooved portion is provided with a plurality of spaced recesses O for receiving the end of the set-screw M.

It will be noted that during the engaging of the cam I with the leaves of the spring, the bearing E does not enter between the leaves. It performs no wedging action, and the groove merely acts to prevent vertical displacement of the bearing E. Therefore there is no tendency, should the device slip during engagement, for the bearing E to be broken off.

While I have shown and described a very desirable form of the invention, I do not wish my protection limited to the particular structure shown, but consider the invention to be of sufficient scope to embody various modifications.

What I claim as my invention is:—

1. In a leaf spring spreader, the combination of a yoke adapted to span the spring, a wedge-shaped spring-engaging bearing carried by one of the arms of the yoke, a revoluble grooved bearing carried by the other arm adapted to engage the edge of one leaf of the spring, and means for effecting a relative movement between said bearings.

2. In a leaf spring spreader, the combination of a yoke adapted to span the spring, a wedge-shaped spring-engaging bearing carried by one of the arms of the yoke, a grooved roller carried by the other arm adapted to engage the edge of one leaf of the spring, and means for effecting a relative movement between said bearings.

3. In a leaf spring spreader, the combination of a yoke adapted to span the spring, a wedge-shaped spring-engaging bearing carried by one of the arms of the yoke, a grooved roller carried by the other arm adapted to engage the edge of one leaf of the spring, and an adjustable member for effecting a relative movement between said bearings.

4. In a leaf spring spreader, the combination of a yoke adapted to span a spring, a spring-engaging bearing carried by one of the arms of the yoke, comprising a pivoted member having an eccentric wedge-shaped edge, a handle for actuating said bearing, and a second bearing carried by the other arm of the yoke, comprising a pivoted roller having the periphery thereof provided with a groove adapted to engage the edge of but one of the leaves of the spring.

5. In a leaf spring spreader, the combination of a yoke adapted to span the spring, a wedge-shaped spring-engaging bearing carried by one of the arms of the yoke, and a coöperating bearing carried by the other arm of the yoke and adapted to have a bearing against one leaf of the spring only, and means for effecting a relative movement between said bearings for the purpose described.

6. In a leaf spring spreader, the combination of a yoke adapted to span the spring, a revoluble wedge-shaped spring-engaging bearing carried by one of the arms of the yoke, a grooved bearing carried by the other arm and adapted to engage the edge of a leaf of the spring and to be freely movable longitudinally thereof, and means for revolving said wedge-shaped bearing to enter between adjacent leaves of the spring.

7. In a leaf spring spreader, the combination of a yoke adapted to span the spring, a member carried by one of the arms of the yoke, provided with a wedge-shaped eccentric spring-engaging bearing, a coöperating bearing carried by the other arm of the yoke and adapted to have a bearing against a leaf of the spring, and a stop upon said member for limiting the movement of the same, said eccentric spring-engaging bearing adapted to remain in the position limited by said stop.

8. In a leaf spring spreader, the combination of a yoke adapted to span the spring, a spring-engaging bearing carried by one of the arms of the yoke, and a lever pivotally connected to the other arm of the yoke, said lever having a cam formed at its inner end, the edge of said cam being wedge-shaped for entering between the leaves of the spring, the wedge-shaped edge being near the pivot at the entering end and having a portion in rear of the entering end at the maximum distance from the pivot, and said cam being provided with a stop in rear of the portion at the maximum distance from the pivot.

9. In a leaf spring spreader, the combination of a yoke adapted to span the spring, a spring-engaging bearing carried by one of the arms of the yoke, and a lever pivotally connected to the other arm of the yoke, said lever having an integral cam formed at its inner end, the edge of said cam being wedge-shaped for entering between the leaves of the spring, the wedge-shaped edge being near the pivot at the entering end and having a portion in rear of the entering end and at a distance from the rear end of the cam at the maximum distance from the pivot.

In testimony whereof I affix my signature in presence of two witnesses.

WESLEY G. WINANS.

Witnesses:
JAMES P. BARRY,
PHYLLIS COBURN.

Copies of this patent may be obtained for five cents each, by addressing the "Commissioner of Patents, Washington, D. C."